United States Patent [19]

Gutridge

[11] Patent Number: 5,018,846
[45] Date of Patent: May 28, 1991

[54] MICROSCOPE

[76] Inventor: John Gutridge, 79, Wensleydale Road, Hampton Middlesex, United Kingdom, TW12 2LT

[21] Appl. No.: 429,684

[22] Filed: Oct. 31, 1989

[30] Foreign Application Priority Data

Jun. 15, 1989 [GB] United Kingdom ............... 8913788
Aug. 2, 1989 [GB] United Kingdom ............... 8917656

[51] Int. Cl.$^5$ .................... G02B 21/18; G02B 21/00
[52] U.S. Cl. ................................ 350/513; 350/507; 350/511
[58] Field of Search ............. 350/507, 508, 512, 513, 350/511

[56] References Cited

U.S. PATENT DOCUMENTS 4,011,748  3/1977  Bond et al. ..................... 350/507

FOREIGN PATENT DOCUMENTS 0047021  2/1989  Japan ........................... 350/507

Primary Examiner—Bruce Y. Arnold
Assistant Examiner—James Phan
Attorney, Agent, or Firm—Townsend and Townsend

[57] ABSTRACT

In an optical microscope, particularly an optical microscope having optics which include divergent beams of light being transmitted to the eyepieces, a facility for display or teaching is provided by replacing a conventional eyepiece with an eyepiece (21) which includes a light tube (22a) and respective inlet and outlet lenses (26) and (27), said light tube (22a) accommodating a beam splitter such as a semi-silvered mirror (29) to deflect a portion (30) of light passing through tube (22a) laterally towards a camera (32).

22 Claims, 2 Drawing Sheets

MICROSCOPE

This invention relates to optical microscopes.

Many kinds of binocular ophthalmic microscope/slit lamps exist which have parallel eyepieces. The geometry of the optical system in such microscopes, and their physical construction lends itself easily to the addition of a teaching arm or video recording/display system. In order to incorporate such a system it is only necessary to interpose a beam-splitter, incorporating a 45° partially-reflective mirror in the light path between the objective and the eyepiece lenses. Diverted light is fed to a camera, such as a video camera, and can be recorded on film or displayed on a screen or diverted to a teaching tube as required. This latter facility is very useful for teaching and other purposes when two or more persons wish to view the image from the microscope.

There is, however, a certain class of microscope wherein such an easier modification is simply not possible. This type of microscope is the microscope which has convergent eyepieces. In such a microscope the eyepieces are disposed at a mutually-inclined angle of about 9°. This is the angle at which the eyes normally are disposed when working at a desk or performing comparable functions. This is the most comfortable angle for the eye and such microscopes are notoriously easy to use, being much less likely to cause eye strain than parallel-eyepiece microscopes. Many such microscopes are in use because of their benefit, but unfortunately they suffer from the drawback that their optical system has a geometry which does not lend itself to the interposition of a beam-slitter within the microscope body as does the geometry of a parallel eyepiece microscope. Accordingly, convergent eyepiece microscopes have not, heretofore, been amenable to the addition of a display facility. One particularly very common form of convergent eyepiece microscope is manufactured by Haag Streit and is known as their "900" microscope. This lack of a display facility on such convergent eyepiece microscopes is a disadvantage. Many are in use and it would be of great advantage to provide such a facility for existing microscopes.

Further, as will be apparent from FIGS. 1 and 2, the previously known method of modifying the microscope requires that the microscope has a body constructed to be separable. This is not always the case, further this prior method requires that the microscope and its installation be such as to allow a significant increase in the overall length of the microscope. This is not always possible when the microscope is part of a larger arrangement. The moving of the eye pieces can make the apparatus much more difficult to use. Further, parts which need to be added to the microscope to provide the beam-splitting facility tend to be quite large, relatively complicated and expensive.

It is relatively easy to include a teaching facility including an extra eyepiece together with a video camera or recorder microscopes which have parallel eyepieces. The reason for this is that the light passing to the eyepieces travels generally along parallel paths. Thus, increasing these path lengths by including a beam splitter (shown in FIG. 2 of the aforesaid application) does not significantly effect the optics of the system. Further, parallel eyepiece microscopes have relatively simple optics, light from the objective lens passing through an intermediate lens and then directly to the eyepieces.

Particular problems arise in relation to binocular microscopes which have divergent eyepieces. The desirability of such microscopes has been previously described in the aforesaid application and it should be emphasized here that in such a microscope there is, essentially, a "binocular" effect in that the light to each eyepiece passes via a prism disposed in an individual casing which connects each eyepiece to the main body of the microscope. This physical mode of construction is a serious bar to the inclusion of a beam splitter/camera facility. In addition, the light travelling to the eyepieces in such a microscope is generally converging. Thus, if the individual housing, or the main housings, were split to include a beam splitter, it would be possible to divert light outwardly of the microscope to a second eyepiece, or to a camera, but it would be extremely difficult for the existing eyepiece to focus on the virtual image which is formed between the eyepiece and the remaining optics. Changing the light path length by introduction of a separate beam splitter portion would require considerable modification of the optics, as well as considerable physical modification of the arrangement. Many hundreds of such instruments are in use, and (as most users would confirm) the modification of such a microscope to include a teaching/camera facility would be a significant advance.

The basic idea of using an eyepiece which includes a beam splitter to direct a portion of light towards a camera and/or a second, observers, eyepiece can be understood quite easily from the foregoing. In putting this proposal into practice certain problems have arisen. Firstly, by introducing extra length in the eyepiece to accommodate the beam splitter and side tube, it proved to be impossible to have the eyepiece lenses focussed on the virtual image formed within the eyepiece. This tended to mean that the exit pupil of the light from the ocular lens was spaced considerably (perhaps 15 to 20 mm) away from the said lens. This made the device extremely difficult to use, as the user's eye was exposed to considerable amounts of stray light from the sides. Such a feature also made it very unusual to use, because it was completely different from most optical apparatus wherein the eyepiece has to be disposed virtually against or touching the eye surround.

A second problem was that the light coming from the beam splitter, being, as has been said, divergent, could not be satisfactorily focused on the CCD chip. This was because the distance between the beam splitter and the chip could not be made sufficiently long to ensure that the light came into focus at a reasonable distance. The apparatus still worked, but only about one third of the image available fell onto the chip. This resulted in reduced intensity of light on the chip and also reduced the field of view on the chip camera by a two thirds.

A further problem in carrying the idea into effect was that the light reaching the camera, having been deflected by the beam splitter was a mirror of the view seen by the observer. This meant that the electronic image generated by the camera needed to be reversed before being viewed by a third party, or in a video in order that the sense of movement could be the same in each case. Whilst left to right reversal of a video picture is theoretically simple and straightforward, in connection with the (desirably) simple electronics to be used in a compact system, the use of electronic reversal leads to added expense. Further, as the basic data coming from the camera needs to be reversed, the provision of the reversing facilities does tend to introduce unacceptable costs, and unacceptable distortion (in the sense of loss of quality) of the eventual image.

As a further disadvantage, the provision of a beam splitter in only one eyepiece, makes the light received by that eye of the observer which looks into that eyepiece of lower intensity than the light coming from the other eyepiece. This leads to a severe loss of stereoscopic vision between the eyes. This is an effect which seems to occur in the brain, and although not completely understood at present, seems to result from the brain's inability to recognize that the two eyes are seeing the same subject when one eye is receiving light of a different intensity from the same image. The effect seems to be similar to the Paulfich effect which has been observed in comparable apparatus.

It is an object of the present invention, therefore, to provide a divergent optic microscope wherein the above described disadvantages are obviated or minimised.

According to a first aspect of the invention there is provided a microscope eyepiece including a light tube surrounding a light path from an inlet end to an outlet lens of the eyepiece, a beam-splitter in the light path along the tube to divert a portion of the light passing through tube laterally of the tube, and a camera mounted to receive said diverted light.

The camera is preferably supported by the eyepiece structure. The eyepiece can be incorporated in a chamber carried by the tube. The chamber carrying the camera can be a short tube branching from the eyepiece tube.

Preferably the camera is in the form of a transducer able to receive said light beam and convert it into electrical signals representative of the light in the beam, said signals being capable of display by a cathode ray television screen or comparable display to give a picture comparable to the view seen by an observer looking into the exit lens of the eyepiece.

The beam-splitter can be a partially reflective mirror extending across the eyepiece tube.

The camera can be a microchip camera. The camera can include on a microchip a plurality of charge couple devices.

The camera is preferably so small as to be capable of easy support by the eyepiece without significant deformation thereof. The camera preferably has an area less than 25 mm by 25 mm, and desirably less than 10 cm by 10 cm. A camera having a receiving screen of charge coupled devices measuring some 6 mm by 6 mm has been found satisfactory. Such a device is extremely light and small and can be incorporated in a microscope eyepiece with little difficulty.

The output signal from the camera can be led to a television screen for observation or to a video recorder for future reference.

The eyepiece can be incorporated in a microscope and the invention includes a microscope fitted with an eyepiece aforesaid. Preferably the microscope is a convergent eyepiece microscope. Normally a microscope will require only one eyepiece of the invention. However, if desired it could be provided with two eyepieces of the invention which would be capable of displaying two images. By appropriate display it is possible that a three-dimensional view could be displayed to several persons. For example, each camera could feed a single screen and observers could be provided with apparatus compelling their one eyes to observe one screen only and their other eyes to observe the other screen only.

According to a second aspect of the invention there is provided, for a divergent optical microscope, an eyepiece including ocular and distal lenses, a side tube and a beam splitter for diverting a portion of the light passing through the eye piece into said side tube, a divergent lens being provided at the end of the eye piece remote from the ocular lens to move the virtual image formed within the eyepiece to a position nearer to the ocular lens.

As a third feature of the invention there is provided an eyepiece for a divergent optic microscope including an ocular lens and a distal lens and a beam splitter arranged and adapted to divert a portion of the light passing through the eyepiece laterally to a camera, wherein a convex lens is provided in the light path between the beam splitter and the camera.

As a fourth feature there is provided a pair of eyepieces for a divergent optic microscope, one of the eyepieces including a beam splitter, the other eyepiece of the set including a neutral density filter arranged and adapted to reduce the intensity of light passing directly through the second eyepiece issuing from the ocular lens of the first eyepiece.

As a fifth feature of the invention there is provided an eyepiece for a divergent optic microscope having a beam splitter for diverting a portion of light passing through the eyepiece laterally out of the eyepiece towards a camera, a second reflector being provided between the beam splitter and the camera. This ensures that both the pupil of the observer facing the eyepiece of the invention, and the camera receive the same picture and there is no need for electronic inversion of the image displayed on the screen.

Preferably, in the set of eyepieces the second eyepiece is optically identical to the first eyepiece apart from the beam splitter. The camera and the second reflector can be accommodated in a tube lying parallel to the eyepiece and connected thereto by a short lateral tube. The lens between the beam splitter and the mirror can be disposed in the lateral tube.

The invention will be described further, by way of example, with reference to the accompanying drawings wherein.

Figure 1:
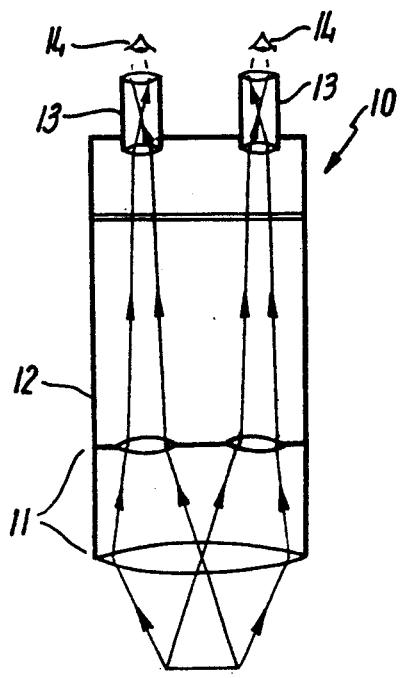
FIG. 1 is a schematic view illustrating a parallel eyepiece conventional microscope.
Figure 2:
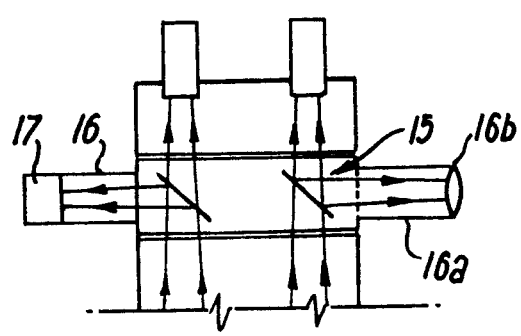
FIG. 2 is a view of the microscope of FIG. 1 but modified by the addition of a beam-splitter and a camera.

Referring now to FIGS. 1 and 2, it will be seen that a conventional parallel eyepiece microscope 10, has an objective lens system 11, a body 12 and two parallel eyepieces 13 before the observer's eyes 14. When modified in accordance with FIG. 2 a beam-splitter 15 including one or two 45° semi-silvered mirrors deflects a proportion of the light down a side tube 16 to a conventional television camera 17 which can pass a signal to a monitor and/or video recorder. As these devices are perfectly conventional they have not been illustrated. Second side tube 16a can lead to a teaching arm 16b.

Figure 4:
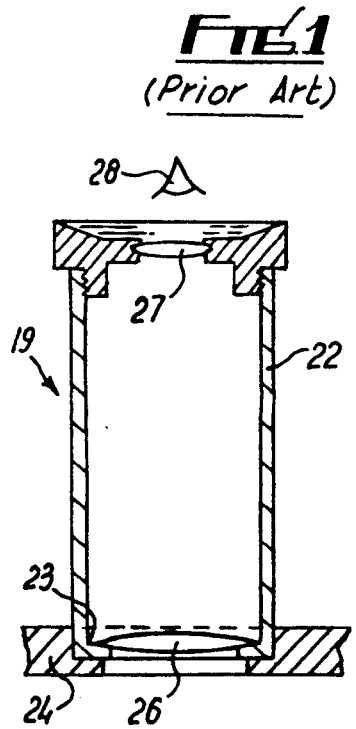
FIG. 4 is an enlarged cross-sectional view illustrating an eyepiece of the microscope of FIG. 3.
Figure 3:
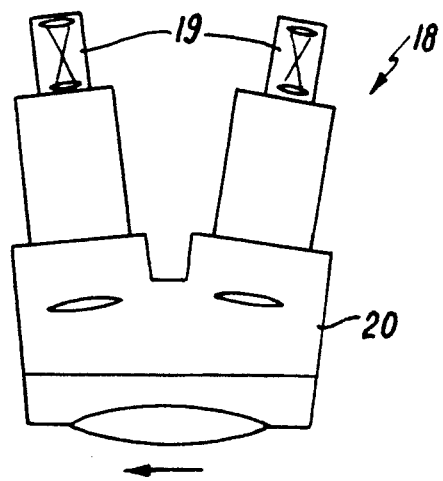
FIG. 3 is a view comparable to that of FIG. 1 but showing a convergent eyepiece microscope.

FIG. 3 illustrates a microscope 18 which has convergent eye pieces 19. The nature of the body 20 and the complicated geometry of the light path within the body 20 (not shown) makes it impossible to modify the body in the way in which the body 12 of the microscope 10 has been modified in FIG. 2. FIG. 4 shows an eyepiece of this microscope 18, having a tube 22, an inlet lens 26 and an outlet lens 27.

Figure 5:
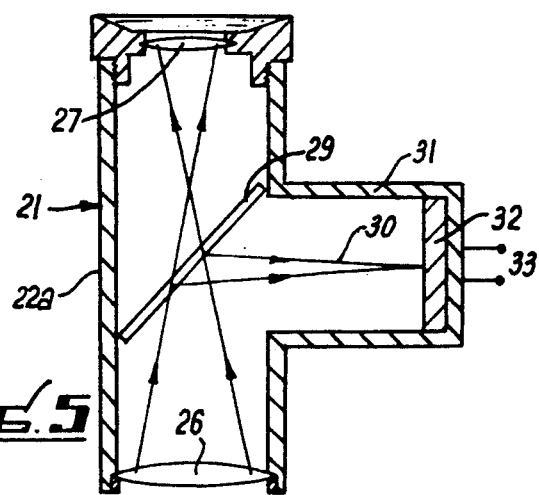
FIG. 5 shows an eyepiece of the invention.

This problem can, however, be overcome using the eye piece 21 of the invention as shown in FIG. 5. The eye piece 21 consists of a tube 22a about 22 mm in diameter. Like the conventional eye pieces 19 tube 22 is a sliding fit within a socket 23 within walling 24 of the body 20. Tube 22 can be secured by a screw (not shown) or the like. The screw normally secures the conventional eye pieces 19. The tube 22a includes an inlet lens 26 and an outlet lens 27 adjacent the observer 28. Lenses 26 and 27 constitute the ocular lens of the microscope. Within the tube 22a is disposed a 45° partially silvered mirror 29 which forms a beam-splitter. Other beam-splitting devices can be used, but a semi-silvered mirror is cheap, conventional and convenient.

Deflected light 30 from the mirror 29 passes into a chamber 31 which is disposed laterally of the tube 22 and which mounts a microchip charge coupled device camera 32. The camera 32 has a sensitive receiving field consisting of large numbers of charge coupled devices formed on a small chip of semi-conductor material, each device being coupled to circuitry within the chip. The camera 32 produces a signal at its outlet (depicted schematically by terminals 33). Signals from terminals 33 can be passed to a monitor, display screen and/or video recorder in conventional manner.

It will be appreciated that this improved eyepiece 21 of the invention can be used in place of an existing eyepiece 19, the modification to the actual microscope 18 being negligible. The eyepiece is a simple and convenient way of converting a convergent eyepiece microscope to allow for demonstration, teaching and the like. Of course, the invention is not limited to use in a convergent eyepiece microscope and can be used with conventional parallel eyepiece microscopes if desired.

Figure 6:
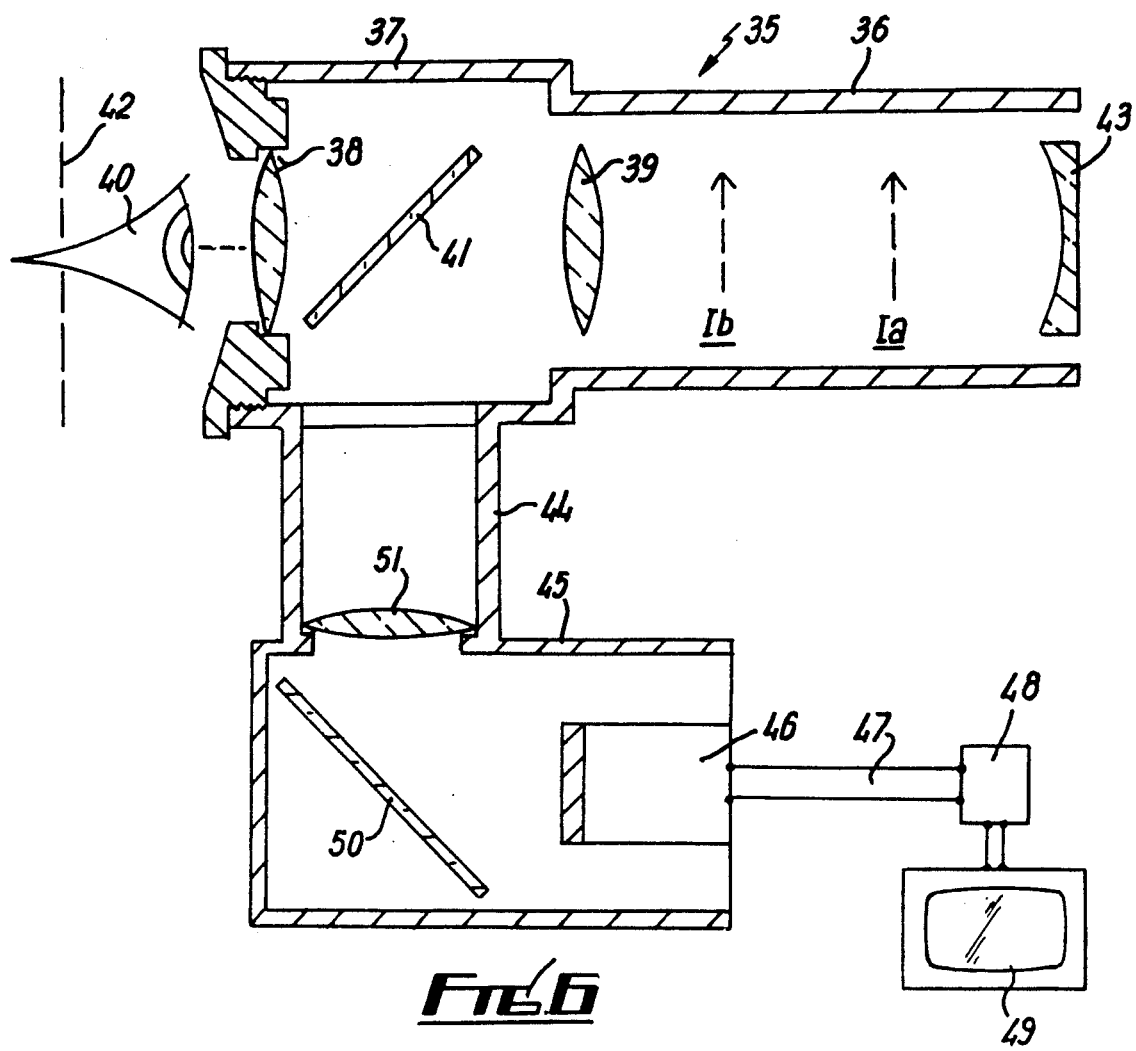
FIG. 6 is a schematic cross-sectional view through a preferred eye piece of the invention.

Referring now to FIG. 6, it will be seen that a second embodiment of eyepiece 35 of the invention includes a pair of co-axial tube sections 36 and 37. Inner tube 36 is of the same diameter as a conventional eyepiece and can be inserted into a divergent optic microscope in the aperture which is formed to receive a conventional eyepiece. In conventional manner the eyepiece includes an ocular lens 38 and a distal lens 39 which lenses are effective to direct light from a virtual image formed by the primary optics of the microscope into the observer's eye 40.

Between the lenses 38 and 39 is disposed a beam splitter which can have any practical form, such as a prism, mirror or the like, but is preferably in the form of a semi-silvered mirror 41. To accommodate the splitter 41 and the lenses 38 and 39, it is necessary that the total length of the tube 36 and 37 exceeds that of a conventional tube usually (depending on the magnification) by some 15 or 20 mm. This has the effect that the lens system constituted by lenses 38,39, is spaced further from the usual virtual image position (illustrated at Ia). The lens system 38,39 would, therefore, normally focus the image Ia in the plane 42. It would be possible for the observer to use the microscope in this condition, but he would have to place his pupil in the plane 42. This is an extremely uncomfortable position and is contrary to almost all optical use, wherein the pupil of the eye is placed very close to the ocular. There is the further problem that incident light can enter from the sides and interfere with the observation. In order to overcome this severe problem, we have found it desirable to include a divergent lens 43 at the inner end of tube 36. This modifies the light coming from the primary optics of the system to produce a virtual image at the position shown at Ib. The position of the image Ib is such that the optical system 38,39 can focus the light on the pupil of the observer's eye 40 whilst disposed close to the ocular 38 in conventional manner.

It should be noted here that it is theoretically possible to overcome this defect by altering the characteristics of lens 38 and 39. However, any serious alteration of lens 39 affects the optic path between the virtual image and the camera (to be later described) and is undesirable. Further, it is desired that lenses 38 and 39 be conventional in power and disposition in order that they do not unduly change the nature of the overall optical system far from its original design parameters. The addition of the lens 43 is a cheap, simple and unexpectedly effective way of compensating for the increased length of the eye piece 35 caused by the provision of the beam splitter 41.

As mentioned previously, the beam splitter 41 is arranged to divert 50% of the light laterally outwards of the tube 37 into a lateral tube 44. Tube 44 connects with a short camera tube 45 which extends parallel to the tubes 36 and 37. Within the camera tube 45 is arranged a CCD chip camera 46 whose output can be taken via leads 47 and circuitry 48 to a television monitor and/or video recorder 49 (all of which are illustrated schematically).

Camera tube 45 also includes a 45° mirror 50. This has the affect that the light reaching the camera 46 has been reflected twice and therefore produces an image on the camera which is the same as that seen by the observer. This has significant effects in saving the costs of electronic inversion and in the inevitable loss of quality which electronic inversion can cause in small and compact electronics.

As has been previously mentioned above, the power and disposition of the lenses 38 and 39 is effectively set by the overall optics of the system and it is undesirable to alter them too greatly. With the arrangements shown within the tubes 36 and 37 the light reaching camera 46 via the beam splitter and mirror would not be completely focused on the The light path is too short. It would, of course, be possible to make the lateral tube, or the camera tube very long, but this is physically undesirable and would make the whole apparatus ungainly and difficult to use. With the physical dimensions of the various tubes as shown in FIG. 6, only about one third of the light issuing from the beam splitter 41 would impinge upon the camera 46 and therefore only one third of the field of view would be seen by the camera. To obviate this problem without going to the above described lengths of inordinate physical sizes, I have found that it is a remarkably neat and simple solution to provide a convergent lens 51 in the light path between the beam splitter 41 and the camera 46. The lateral tube 44 can provide a very convenient mounting for the lens 51.

Figure 7:
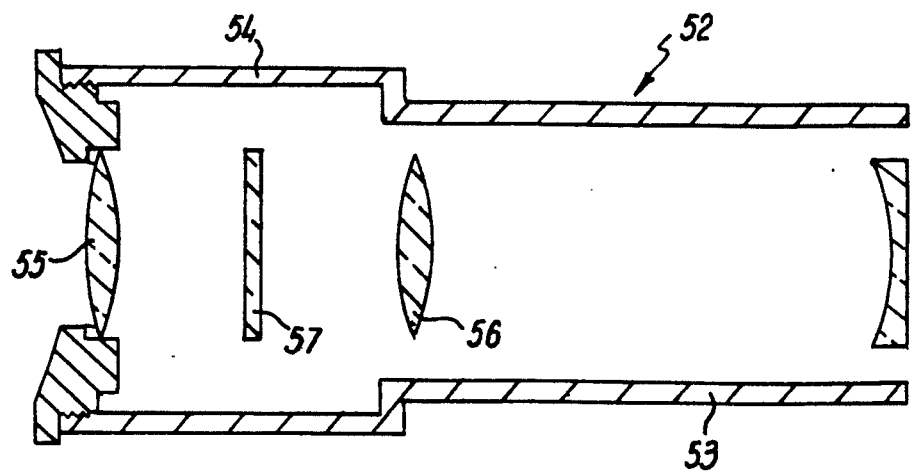
FIG. 7 is a comparable view through a companion eyepiece of the invention.

FIG. 7 illustrates a companion eyepiece 52. When the eyepiece 35 is used as one eyepiece of a divergent binocular optic microscope the eyepiece 52 can conveniently be used as the other eyepiece. Eyepiece 52 has tubes 53 and 54 comparable to tubes 36 and 37 as well as ocular and distal lens 55 and 56 identical to lenses 38 and 39. Between the lenses 55 and 56 is disposed a neutral density filter 55 whose function is to reduce the intensity of light exiting via ocular 55 to be generally the same as that exiting from the ocular 38, thereby compensating for the light diverted by the splitter 41. This ensures that the intensity of the image received by the observer's eyes is generally the same and therefore three dimensional vision is not impaired.

The invention is not limited to the precise details of the foregoing and variations can be made thereto.

For example, although the various lenses have been shown as simple single element lenses, it would be appreciated that one or more thereof can be compound lenses to compensate for lens aberrations. One or more of the lenses can be interchangeable to provide an eyepiece of varying magnification. Alternatively, the powers of the various lenses can be chosen in a particular eyepiece to give a particular magnification. A further separate eyepiece can have different lenses to have a different magnification.

Many further modifications are possible within the scope of the invention.

I claim:

1. A pair of eyepieces for a divergent optic microscope, a first one of the eyepieces including a beam splitter, a second one of eyepieces of the pair including a neutral density filter arranged and adapted to reduce the intensity of light passing directly through the second eyepiece issuing from the ocular lens of the first eyepiece.

2. A pair of eyepieces as set forth in claim 1 wherein said second eyepiece is optically identical to the first eyepiece.

3. A divergent optical microscope comprising:
   an objective lens system and first and second eyepieces each having an axis, said axes of said eyepieces being arranged at an angle to each other;
   said objective lens system providing first and second light beams, which beams travel along respective paths toward one or the other of said eyepieces, said respective paths diverging in a direction toward said eyepieces at an angle substantially equal to said angle between said axes of said eyepieces;
   said eyepieces comprising a light tube having one light outlet end and one light inlet end, said outlet end having an ocular lens and said inlet end having a distal lens;
   a beam splitter positioned in said first eyepiece between the ocular and distal lens, said beam splitter receiving said first light beam and producing a diverted portion received by a camera and a substantially non-diverted portion passing to said ocular lens, said diverted portion having a first intensity and said non-diverted portion having a second intensity; and
   means for reducing the intensity of said second light beam to substantially equalize the intensities of the second light beam and the non-diverted portion of said first light beam.

4. A microscope as set forth in claim 3 wherein said means is provided in said second eyepiece.

5. A microscope as set forth in claim 3 wherein said means is a neutral density filter.

6. A microscope as set forth in claim 3 wherein said means is a beam splitter.

7. A microscope as set forth in claim 3 wherein a divergent lens is provided in the path of said first light beam before it reaches said distal lens of said first eyepiece to move a virtual image formed before said distal lens near to said ocular lens.

8. A microscope as set forth in claim 3 including a chamber branching from said light tube for mounting said camera.

9. A microscope as set forth in claim 3 including said camera, and wherein said camera comprises a transducer mounted to receive said diverted portion of said first light beam and convert it into electrical signals representative of said diverted light beam, said signals being capable of display by a cathode ray television screen.

10. A microscope as set forth in claim 3 wherein said beam-splitter is a partially reflective mirror extending across said light tube.

11. A microscope as set forth in claim 8 wherein said camera is a microchip camera including a plurality of charge-couple devices.

12. A microscope as set forth in claim 11 wherein said microchip camera has a receiving screen of charge-coupled devices measuring less than 10 mm by 10 mm.

13. A microscope as set forth in claim 11 wherein said microchip camera has a receiving screen of charge-coupled devices measuring 6 mm by 6 mm.

14. A microscope as set forth in claim 3 including a convex lens between said beam splitter and said camera.

15. A microscope as set forth in claim 3 including a reflector between said beam splitter and said camera.

16. A microscope as set forth in claim 14 including a light conduit extending parallel to said light tube of said one eyepiece and optically connected thereto by a lateral tube, and wherein said convex lens is disposed in said light conduit.

17. A divergent optical microscope comprising an objective lens system and first and second eyepieces each having an axis, said axes of said eyepieces being arranged at an angle to each other, each of said eyepieces comprising a light tube having a light outlet end and a light inlet end, said outlet end having an ocular lens and said inlet end having a distal lens;
   the first eyepiece having a beam splitter between its ocular and distal lenses for directing a first portion of a first light beam passing through the distal lens of said eyepiece, said first portion having a first intensity, and for directing a second portion of said first light beam having a second intensity to said ocular lens;
   a second light beam passing from the light inlet to the light inlet of said second eyepiece; and
   means intercepting the second light beam for reducing its intensity to an intensity substantially equal to said second intensity, so that the ocular lens of the second eyepiece receives a light beam of an intensity substantially equal to that of the light beam received by the ocular lens of the first eyepiece.

18. A pair of eyepieces as set forth in claim 17 wherein said means is a neutral density filter.

19. A pair of eyepieces as set forth in claim 17 wherein said means is a beam splitter.

20. A pair of eyepieces as set forth in claim 17 including a camera positioned to receive the first portion of the first light beam, and wherein a convex lens is provided between said beam splitter and said camera.

21. A pair of eyepieces as set forth in claim 17 including a camera positioned to receive the first portion of the first light beam, and wherein a reflector is provided between said beam splitter and said camera.

22. A pair of eyepieces as set forth in claim 20 including a light conduit extending parallel to said light tube of said one eyepiece and optically connected thereto by a lateral tube, and wherein said convex lens is disposed in said light conduit.

* * * * *